United States Patent
Karakoyunlu et al.

(10) Patent No.: US 11,151,290 B2
(45) Date of Patent: Oct. 19, 2021

(54) TAMPER-RESISTANT COMPONENT NETWORKS

(71) Applicant: Analog Devices, Inc., Wilmington, MA (US)

(72) Inventors: Deniz Karakoyunlu, Cambridge, MA (US); Tze Lei Poo, Cambridge, MA (US)

(73) Assignee: Analog Devices, Inc., Wilmington, MA (US)

( * ) Notice: Subject to any disclaimer, the term of this patent is extended or adjusted under 35 U.S.C. 154(b) by 227 days.

(21) Appl. No.: 16/133,602

(22) Filed: Sep. 17, 2018

(65) Prior Publication Data

US 2020/0089921 A1 Mar. 19, 2020

(51) Int. Cl.

| | |
|---|---|
| *G06F 21/87* | (2013.01) |
| *G06F 21/75* | (2013.01) |
| *H04L 9/08* | (2006.01) |
| *G06F 21/73* | (2013.01) |
| *G06F 21/88* | (2013.01) |
| *G06F 21/72* | (2013.01) |

(52) U.S. Cl.
CPC ............ *G06F 21/87* (2013.01); *G06F 21/72* (2013.01); *G06F 21/73* (2013.01); *G06F 21/75* (2013.01); *G06F 21/88* (2013.01); *H04L 9/0866* (2013.01)

(58) Field of Classification Search
CPC .......... G06F 21/87; G06F 21/72; G06F 21/73; G06F 21/75; G06F 21/88; H04L 9/0866
USPC ...................................................... 726/34
See application file for complete search history.

(56) References Cited

U.S. PATENT DOCUMENTS

| | | |
|---|---|---|
| 5,185,717 A | 2/1993 | Mori |
| 5,406,630 A | 4/1995 | Piosenka et al. |
| 8,510,608 B2 | 8/2013 | Futa et al. |
| 8,516,269 B1 | 8/2013 | Hamlet et al. |

(Continued)

OTHER PUBLICATIONS

Tamper Resistance Mechanisms for Secure Embedded Systems Srivath Ravi, Anand Raghunathan, Srimat Chakradhar 1 Proceedings of the 17th International Conference on VLSI Design (VLSID'04). pp. 1-7 (Year: 2004).*

(Continued)

*Primary Examiner* — Samson B Lemma
*Assistant Examiner* — Mohammad S Shams
(74) *Attorney, Agent, or Firm* — Wolf, Greenfield & Sacks, P.C.

(57) ABSTRACT

According to various aspects, systems and methods are provided for improving a computer system's resistance to tampering. A PUF may be one component of a system. Other components of the system may not have the same level of protection against tampering as the PUF. According to one aspect, tamper protection provided by the PUF may be extended to one or more other components of the system, thus creating a network of tamper-resistant components. The system may include a tamper detection circuit that receives signals from the component(s). The tamper detection circuit generates an output signal based on the received signals that indicates whether any of the components has been tampered with. The PUF may be configured to use the output signal to generate secret information. If the output signal indicates that one of the components has been tampered with, the PUF may prevent generation of the correct secret information.

23 Claims, 8 Drawing Sheets

(56) References Cited

U.S. PATENT DOCUMENTS

| | | | |
|---|---|---|---|
| 8,868,923 | B1 | 10/2014 | Hamlet et al. |
| 8,918,647 | B1 | 12/2014 | Wallrabenstein |
| 9,071,446 | B2* | 6/2015 | Kreft .................. G06F 21/335 |
| 9,292,692 | B2 | 3/2016 | Wallrabenstein |
| 9,418,250 | B2* | 8/2016 | Brooker ................ G06F 21/87 |
| 9,461,826 | B2 | 10/2016 | Kreft |
| 9,501,664 | B1* | 11/2016 | Hamlet ............. G06K 9/00577 |
| 9,536,581 | B2 | 1/2017 | Katoh et al. |
| 9,715,590 | B2 | 7/2017 | Gardner et al. |
| 9,787,480 | B2 | 10/2017 | Guo et al. |
| 9,876,645 | B1 | 1/2018 | Ramalingam et al. |
| 9,948,471 | B2 | 4/2018 | Katoh |
| 2009/0083833 | A1* | 3/2009 | Ziola ...................... G06F 21/31 726/2 |
| 2010/0031065 | A1* | 2/2010 | Futa ...................... H04L 9/0866 713/194 |
| 2010/0225380 | A1* | 9/2010 | Hsu ...................... H01L 23/576 327/514 |
| 2011/0099117 | A1 | 4/2011 | Schepers et al. |
| 2011/0215829 | A1 | 9/2011 | Merchan et al. |
| 2012/0179952 | A1* | 7/2012 | Tuyls ...................... H04L 9/002 714/768 |
| 2013/0104252 | A1 | 4/2013 | Yanamadala et al. |
| 2013/0138710 | A1* | 5/2013 | Yamamoto ............. G06F 7/588 708/250 |
| 2013/0312122 | A1* | 11/2013 | Arora .................... G06F 21/755 726/34 |
| 2014/0108786 | A1* | 4/2014 | Kreft .................. H04L 63/0428 713/156 |
| 2014/0181534 | A1* | 6/2014 | Nowottnick ............ G06F 21/72 713/192 |
| 2015/0192637 | A1 | 7/2015 | Falk et al. |
| 2016/0026829 | A1* | 1/2016 | Brocker ................ G06F 21/87 726/34 |
| 2016/0080153 | A1 | 3/2016 | Suzuki |
| 2016/0255154 | A1 | 9/2016 | Kim et al. |
| 2017/0257222 | A1* | 9/2017 | Pedersen ............... G06F 3/0679 |
| 2018/0018673 | A1 | 1/2018 | Muchsel et al. |
| 2018/0129801 | A1 | 5/2018 | Cambou |
| 2018/0351753 | A1* | 12/2018 | Gardner .................. H04L 9/085 |
| 2019/0028282 | A1* | 1/2019 | Sharifi .................. H04L 9/3278 |
| 2019/0221139 | A1* | 7/2019 | Schrijen ............... G06F 3/0679 |
| 2020/0097682 | A1* | 3/2020 | Couillard ................ G06F 21/72 |
| 2021/0091952 | A1* | 3/2021 | Wentz .................. H04L 9/3247 |

OTHER PUBLICATIONS

Verification of Web Content Integrity: A new approach to protecting servers against tampering Shadi Aljawarneh, Christopher Laing, and Paul Vickers School of Computing, Engineering & Information Sciences Northumbria University, Newcastle upon Tyne, Newcastle, UK, pp. 1-7 (Year: 2007).*

Cioranesco et al., Cryptographically Secure Shields. 2014 IEEE International Symposium on Hardware-Oriented Security and Trust (HOST). IEEE. 2014; pp. 25-31.

Eisenbarth et al., A Survey of Lightweight-Cryptography Implementations. IEEE Design & Test of Computers. 2007;24(6):522-533.

Helfmeier et al. Breaking and Entering through the Silicon. CCS' 13. Berlin, Germany. Nov. 4-8, 2013; pp. 733-743.

Karakoyunlu et al., Differential Template Attacks on PUF Enabled Cryptographic Devices. 2010 IEEE International Workshop on Information Forensics and Security. Seattle, WA. Dec. 12-15, 2010; 6 pages.

Merli et al., Protecting PUF Error Correction by Codeword Masking. International Association for Cryptologic Research 2013:1-16.

Ngo et al. Cryptographically Secure Shield for Security IPs Protection. IEEE Transactions on Computers. 2017; 66(2):354-360.

Tuyls et al, Read-Proof Hardware from Protective Coatings. International Workshop on Cryptographic Hardware and Embedded Systems. Springer. Berlin, Heidelberg, 2006; 15 pages.

* cited by examiner

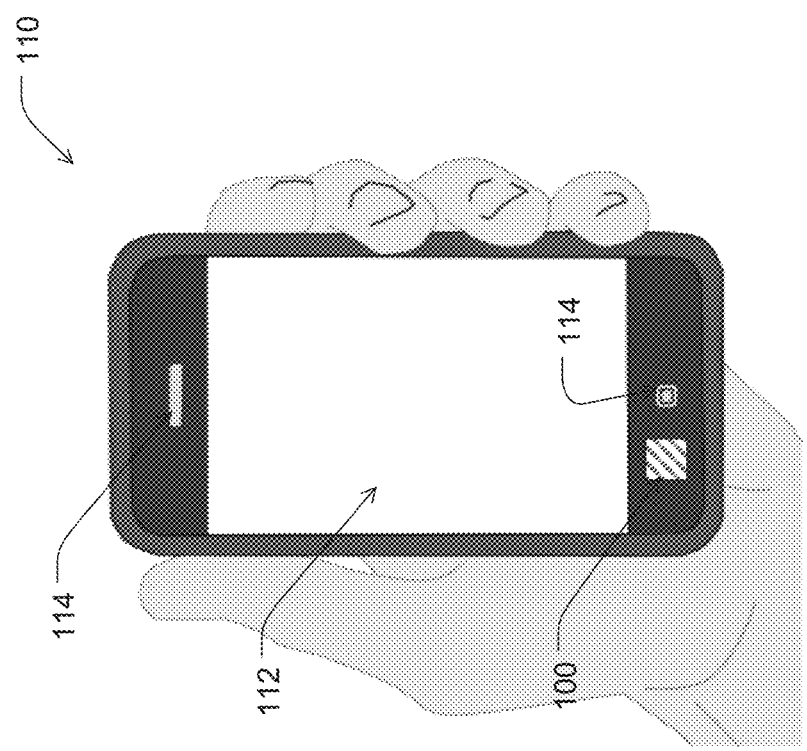

TAMPER-RESISTANT COMPONENT NETWORKS

FIELD OF THE DISCLOSURE

The present disclosure relates to systems and techniques for providing protection against tampering of a system.

BACKGROUND

A physical unclonable function (PUF) may generate an output based on its physical properties. If the PUF is tampered with, its physical properties may change. As a result, the output characteristics of the PUF may be modified.

SUMMARY OF THE DISCLOSURE

According to various aspects, systems and methods are provided for improving a computer system's resistance to tampering. A PUF may be one component of a system. Other components of the system may not have the same level of protection against tampering as the PUF. According to one aspect, tamper protection provided by the PUF may be extended to one or more other components of the system, thus creating a network of tamper-resistant components. The system may include a tamper detection circuit that receives signals from the component(s). The tamper detection circuit generates an output signal based on the received signals that indicates whether any of the components has been tampered with. The PUF may be configured to use the output signal to generate secret information. If the output signal indicates that one of the components has been tampered with, the PUF may prevent generation of the correct secret information.

According to one aspect, a component circuit network for providing a system protection against tampering is provided. The network comprises: a component in a secure processing chain of the system; a hardware identity module configured to generate secret information; a logic circuit coupled to the component and the hardware identity module, the logic circuit configured to: receive a signal from the component; and output an output signal to the hardware identity module indicating whether the component has been tampered with; wherein the hardware identity module is configured to generate the secret information based on physical properties of the hardware identity module and the output signal indicating whether the component has been tampered with.

According to another aspect, a method of protecting a system against tampering is provided. The method comprises: generating, by a hardware identity module, secret information; receiving, by a logic circuit, a signal from a component in a secure processing chain of the system; outputting, by the logic circuit based on the signal, an output signal to the hardware identity module, the output signal indicating whether the component has been tampered with; wherein generating the secret information comprises generating the secret information based on physical properties of the hardware identity module and the output signal indicating whether the component has been tampered with.

According to another aspect, a component network (also referred to herein as a "network") for protecting a system against tampering is provided. The network comprises: a hardware identity module configured to generate secret information based on physical properties of the hardware identity module; a plurality of components of a secure processing chain of the system; a logic circuit coupled to the plurality of components and the hardware identity module, the logic circuit configured to: determine, based on signals from the plurality of components, that one or more of the plurality of components have been tampered with; and output, to the hardware identity module, an output signal indicating that the one or more components have been tampered with; wherein the hardware identity module is configured to prevent generation of the secret information in response to the signal indicating that the one or more components have been tampered with.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

FIG. 1C shows an embodiment of a device including the system of FIG. 1A.

DETAILED DESCRIPTION

Figure 1A:
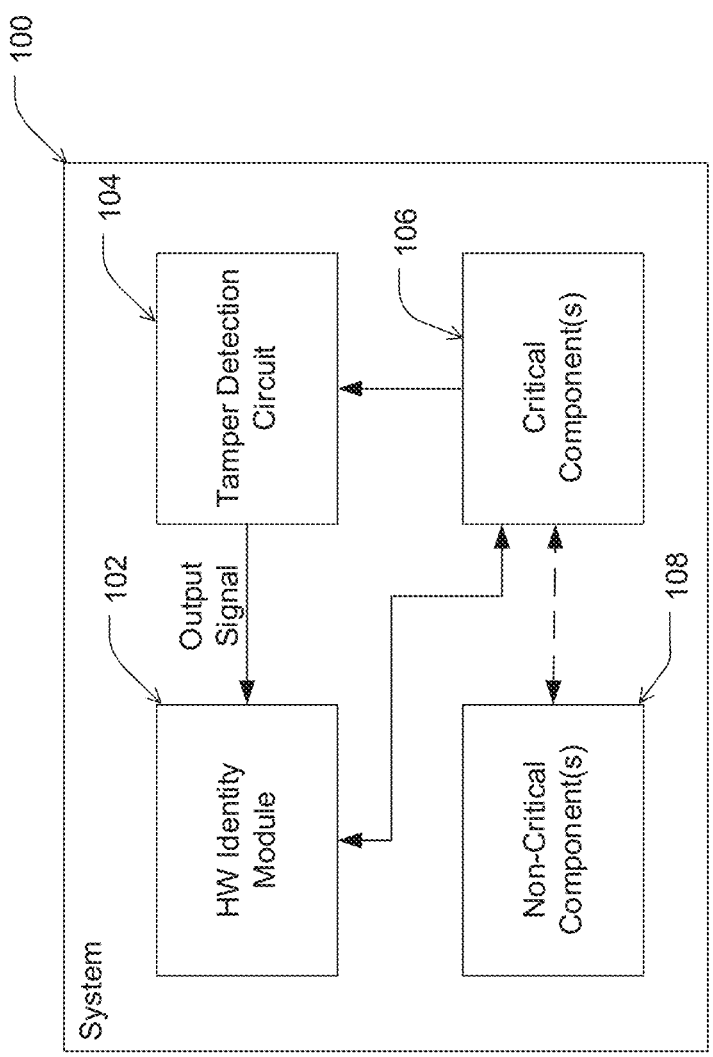
FIG. 1A shows an embodiment of a system including a tamper-resistant component network.

Physical unclonable functions (PUFs) are typically intended to be resistant to tampering. The PUF generates an output dependent on its physical properties. Tampering with the PUF changes its physical properties, thus changing the output it generates for a given input. A PUF used to generate secret information, such as a key, secret, or portion thereof, may be rendered incapable of producing the correct secret information if tampered with in a manner which changes its physical properties. Thus, for example, a malicious entity may be prevented from recovering the secret information by tampering with the PUF, since such tampering may alter the physical properties of the PUF and thereby prevent the PUF from outputting the correct secret information.

However, the inventors have recognized that a PUF may be a component of a system which includes other components, and that the other components of the system may not have the same tamper protection properties of the PUF. For example, the PUF may be a component of a system on a chip (SoC) that includes other components with which the PUF may interact, such as a central processing unit (CPU), random access memory (RAM), non-volatile memory (NVM), peripheral ports, general purpose input/output (GPIO), and/or application specific hardware accelerators. The security provided by the PUF may be bypassed or compromised if an adversary were to tamper with another component that does not have the same tamper protection properties of the PUF. For example, during an authentication operation of the system, the PUF may generate a key which is temporarily stored in RAM separate from the PUF. An adversary may tamper with the RAM, reading the key from the RAM after it is transmitted from the PUF. In another example, a CPU of the system may process private information about a user, such as a user's social security number. An adversary may bypass the security provided by the PUF and tamper with the CPU to access the private information. Similarly, other components of the system may also be susceptible to tampering/attacks that allow an adversary to bypass the protection provided by the PUF.

A system including a PUF connected to communicate with other components may be tampered with by a legitimate user of the system or another user (e.g., an adversary) with physical access to the system. The system may be susceptible to a non-invasive attack in which the system remains intact. For example, in a side channel attack, an adversary may probe various signals and properties of the system during one or more operations. The signals and properties include time required to complete the operation(s), power consumption during the operation(s), and/or monitoring leakage of electromagnetic radiation during operation(s). The system may also be susceptible to invasive attacks in which portions of the system are physically removed or altered. For example, a user may probe voltages of the system during the operation(s), cut wires to gain access to one or more signals, and/or use focused ion beam (FIB) techniques to analyze specific portions of a chip of the system.

Some embodiments of the present application extend security provided by a PUF of a system to other components in the system, thus creating a tamper-resistant security enclave including the PUF. The security enclave created in the system may be referred to as a tamper-resistant security network. In some embodiments, a tamper-resistant component network extends the tamper protection provided by the PUF to one or more other components in the network. In some embodiments, signals collected from the component(s) in the network may be fed into a tamper detection circuit which generates an output signal indicating whether any component in the network has been tampered with. The output signal may also be referred to herein as a "tamper indication signal," "tamper indication logic signal," "tamper resistant network status signal," "security network status signal," or by other similar terminology. The tamper indication signal may then be integrated into operation of the PUF to extend the security provided by the PUF to the component(s) in the network. For example, the signal may be (1) used as an input into the PUF, based on which the PUF generates an output, (2) combined with a PUF output, and/or (3) used to process a PUF output. If the tamper indication signal indicates that one of the component(s) in the network have been tampered with, the operation of the PUF may be modified and, in turn, prevent subsequent access to the system or data in the system. For example, the PUF may generate an incorrect output that results in failed authentication as a result of the modification to operation of the PUF. The failed authentication may prevent completion of an operation by the system.

The aspects and embodiments described above, as well as additional embodiments, are described further below. These aspects and/or embodiments may be used individually, all together, or in any combination of two or more, as the application is not limited in this respect.

FIG. 1A shows a system 100 with a hardware identity module 102, a tamper detection circuit 104, one or more critical components 106, and one or more non-critical components 108. The critical component(s) 106 may be a network of components that are coupled to the tamper detection circuit 104 for protection against tampering. In some embodiments, the tamper detection circuit may be considered to be part of the network, as may be the hardware identity module 102. In some embodiments, the critical component(s) 106 may be part of a secure processing chain in the system 100 in which information is to be protected from tampering. For example, one or more of the critical component(s) 106 may receive an authentication key that is used for authenticating the system 100. If the key is revealed outside the system 100, the security of the system 100 may be compromised. In another example, one or more of the critical component(s) 106 may receive, process, and/or generate private information (e.g., a social security number, bank account number, or other sensitive information) that is to be protected from being revealed outside of the system. The non-critical component(s) 108 may be those that are not part of the network of components that are coupled to the tamper detection circuit 104. In some embodiments, the non-critical component(s) 108 may be those that are not part of the secure processing chain in the system 100. Examples are described further below.

In some embodiments, the tamper detection circuit 104 receives one or more signals on one or more connections from the critical component(s) 106. The tamper detection circuit 104 uses the signal(s) to generate an output signal that indicates whether any of the critical components 106 has been tampered with. The tamper detection circuit 104 outputs the generated output signal via a connection to the hardware identity module 102 which uses the output signal to generate secret information. In some embodiments, the hardware identity module 102 may be configured to prevent generation of valid secret information when the output signal on of the tamper detection circuit 104 indicates that one or more of the critical component(s) 106 has been tampered with. In some embodiments, the hardware identity module 102 may additionally or alternatively be configured to generate a flag indicating detection of tampering with the system 100 when the output signal from the tamper detection circuit indicates that one or more of the critical components 106 has been tampered with.

In some embodiments, the hardware identity module 102 may comprise a device that generates an output signal dependent on unique physical properties of the hardware identity module 102. In some embodiments, the hardware identity module 102 comprises a physical unclonable function (PUF) that generates the output signal. For example, the PUF may comprise a chip which includes electrical circuits. Variations in manufacturing process and parts may give the electrical circuits of the chip unique hardware characteristics. The PUF may be configured to generate an output signal based on the unique hardware characteristics specific to the electrical circuits. The variations that give the PUF its unique hardware characteristics are uncontrollable during manufacturing making it is impossible to duplicate the structure of the PUF. In some embodiments, the PUF provides the system 100 with a unique hardware-based identity.

In some embodiments, the PUF may be configured to generate output signals based on one or more input signals. For example, the PUF may be configured to, in response to receiving the input signal(s), generate an output signal based on unique hardware properties of the PUF and the input. In some embodiments, the input signal may comprise a challenge. For example, the challenge may comprise a set of one or more bits that are inputted to the PUF. The PUF may be configured to generate a response in response to receiving the set of input bit(s). The generated PUF response is based on the challenge and the unique hardware characteristics of the PUF.

In some embodiments, the PUF may be configured to generate an output signal without receiving an input signal. For example, a static random access memory (SRAM) PUF may be configured to generate an output signal based on the state of memory bits. An SRAM includes a number of SRAM cells. Each SRAM cell has a preferred state every time that the SRAM is powered on. The preferred state of each SRAM cell is based on random variations that occurred during manufacturing of the SRAM memory. By requesting the state of the memory bits at a memory address or addresses, the SRAM PUF generates a unique value which may be used for encoding secret information (e.g., a key, or shares of a key). In some embodiments, the unique value may comprise a random bit pattern. To extract the unique value from the SRAM PUF, the SRAM PUF may be powered-on to read out the unique value from the SRAM PUF when the unique value is needed for generation of secret information.

In some embodiments, an output signal of the PUF may be noisy and vary slightly across multiple evaluations of a constant input. In some embodiments, the PUF may comprise a fuzzy extractor to generate a value using an output signal of the PUF that is constant for a fixed input. For example, fuzzy extraction can be implemented using an error correction code (ECC) and helper data to recover a constant value for a fixed input to the PUF. Algorithm 1, below, illustrates an example algorithm to generate the helper value or string.

---

Algorithm 1 Gen Algorithm

---

Input : A finite field $\mathbb{F}_n$ of order n; A challenge c
$O \leftarrow PUF(c)$
$V \in \mathbb{F}_n$
$P \leftarrow O \oplus ECC(V)$
return $\langle V, P \rangle$

---

In Algorithm 1 above, the PUF generates a response O to a challenge c. Next, the PUF generates a random k-bit value V that is to be reconstructed at a subsequent time in response to receiving the challenge c. Next, the PUF generates a helper data (e.g., a string) P as the output of O xor ECC(V). ECC can, for example, comprise a binary (n, k, 2t+1) error correcting code of length n capable of correcting t errors. Algorithm 2, below, illustrates an example of how the helper data P may be used to recover the value V using the PUF.

---

Algorithm 2 Rep Algorithm

---

Input : A challenge c, Helper string P
$O' \leftarrow PUF(c)$
$V \leftarrow D(P \oplus O')$
return V

---

In Algorithm 2 above, the helper data (e.g., generated by executing Algorithm 1) is used to recover V when the PUF receives challenge c. The PUF first generates a response O' to challenge c. The response O' may be slightly different than the response O generated in Algorithm 1. The PUF can then recover V using decoding scheme D corresponding to the correction code ECC used in Algorithm 1. In some embodiments, the value V can be recovered using the helper string P and the decoding scheme D when O' is within a distance t of O. In some embodiments, the distance t may comprise a number of differences between two strings of equal length.

In some embodiments, the tamper detection circuit 104 is coupled to the critical component(s) 106 of the system. The tamper detection circuit 104 may be configured to receive signals from the critical component(s) 106 of the system via connections to the component(s) 106. In some embodiments, the connections may be wires. In some embodiments, the connections may be traces of a circuit board on which the system 100 is disposed. The signals may indicate a state of the respective critical component(s) 106 of the system. In some embodiments, the signals may comprise values of configuration parameters of the critical component(s) 106. In some embodiments, the signals may comprise deterministic values of the configuration parameters of the critical component(s) 106. Example signals are discussed in detail with reference to FIG. 1B.

In some embodiments, the tamper detection circuit 104 outputs an output signal to the hardware identity module 102. The output signal is determined based on the signals from the critical component(s) 106 received by the tamper detection circuit 104. In some embodiments, the tamper sensitive signals from the critical components 106 are configured to remain unchanged during operation of the system 100 when there is no tampering. If an adversary were to tamper with one or more of the critical components 106 of the system, a signal output by the corresponding tampered component(s) may change in response to the tampering. The change in the signal(s) results in a change in the output signal output by the tamper detection circuit 104. In some embodiments, the tamper detection circuit 104 may be configured to propagate the change in the output signal promptly (e.g., instantaneously) in response to the change in the signal(s). In some embodiments, the tamper detection circuit 104 may be configured to propagate a corresponding change in the output signal output by the tamper detection circuit 104 in the time it takes for the electricity to propagate through the circuit 104 in response to a change in one of the signals from the critical component(s) 106. In some embodiments, the tamper detection circuit 104 may be configured to read values in a manner that does not require a clock cycle. For example, the tamper detection circuit 104 may not read values from a register. In another example, the tamper detection circuit 104 may read one or more outputs of combinational logic. The combinational logic may generate one or more signals that depend on current values of one or more inputs on which the signal(s) are based, without requiring information about past values of the input(s). For example, the generated signal(s) may be outputs of a Boolean circuit that generates the signal(s) based on current values of the input(s).

The hardware identify module 102 may be configured to use output signal on line L2 received from the tamper detection circuit 104 in one or more of various manners. In some embodiments, the hardware identity module 102 may be configured to use the output signal received from the tamper detection circuit 104 to generate secret information (e.g., a key or shares thereof). The hardware identity module 102 may be configured to prevent subsequent generation of the secret information in response to receiving an indication from the tamper detection circuit 104 that one or more of the critical components 106 has been tampered with. In some embodiments, the hardware identity module 102 may be configured to prevent subsequent generation of the secret information in response to a change in the output signal from the tamper detection circuit 104. For example, the output signal may have a first value that indicates that the critical components 106 are secure as indicated by the signals received by the tamper detection circuit 104 from the critical components 106. The hardware identity module 102 may be configured to prevent subsequent generation of a key or one or more shares of the key in response to a change of the output signal from the first value. In some embodiments, the hardware identify module 102 may be configured to generate an incorrect value in response to a change in the output signal from the tamper detection circuit 104. For example, the hardware identity module 102 may be configured to generate an incorrect key, or shares thereof in response to the output signal changing from a first value that indicates that the critical components 106 are secure. The incorrect value generated by the hardware identity module 102 may cause the system 100 to fail an authentication and/or prevent subsequent access to portions of the system.

The critical components 106 may represent various things. In some embodiments, the critical components 106 may represent, and be referred to as, a secure processing chain of component(s). The secure processing chain of component(s) may be those that receive, process, store and/or generate data that is to be protected or kept secure. The critical components 106 may represent, and be referred to as, a secure boundary of the system 100 within which data and/or operations are to be protected against tampering. The components within the "boundary" may operate on or store protected data, whereas components outside the boundary may not operate on or store protected data and thus may not need the same protections. The critical components 106 may represent, and be referred to as, trusted processing components. Security provided by the hardware identity module 102 may be extended to the critical component(s) 106 such that the critical component(s) 106 can be trusted to have protection against tampering.

In some embodiments, the system 100 may be configured to perform an enrollment phase in which the system 100 is known to be in a secure condition. The secure condition may be one in which it is unlikely or impossible that tampering with the system 100 would take place. For example, the enrollment phase may take place in a manufacturing facility when the system 100 is first manufactured before the system 100 is used outside of the manufacturing facility (e.g., by a customer). During the enrollment phase, the tamper detection circuit 104 may generate the output signal based on signal values of the critical component(s) 106 when the critical component(s) 106 are known to be in a secure state. In some embodiments, the signals output by the critical components 106 remain at the values captured during the enrollment phase so long as the respective components are not tampered with. The hardware identity module 102 may be configured to generate secret information using the output signal generated by the tamper detection circuit 104 in the secure state in which there is no tampering. The hardware identity module 102 may be configured to enroll the secret information generated in the secure state to be used for subsequent authentication based on the generated output signal.

In some embodiments, the hardware identity module 102 may be configured to require that the critical component(s) 106 be in the same state as during the enrollment phase as indicated by the signals received by the tamper detection circuit 104. After the enrollment phase, tampering with one or more of the critical component(s) 106 may result in changes in one or more signals that are transmitted to the tamper detection circuit 104. The changes in the signal(s) may cause a change in the output signal output by the tamper detection circuit 104. The hardware identity module 102 may be configured to require an output signal from the tamper detection circuit that matches the output signal of the tamper detection circuit during an enrollment phase in order to generate valid secret information (e.g., a key, or shares of a key). A change in the output signal may prevent the hardware identity module 102 from generating secret information required to perform an operation (e.g., authentication of the system 100). For example, the change in the output signal may prevent the hardware identity module 102 from reconstructing a key enrolled during the enrollment phase.

Figure 1B:
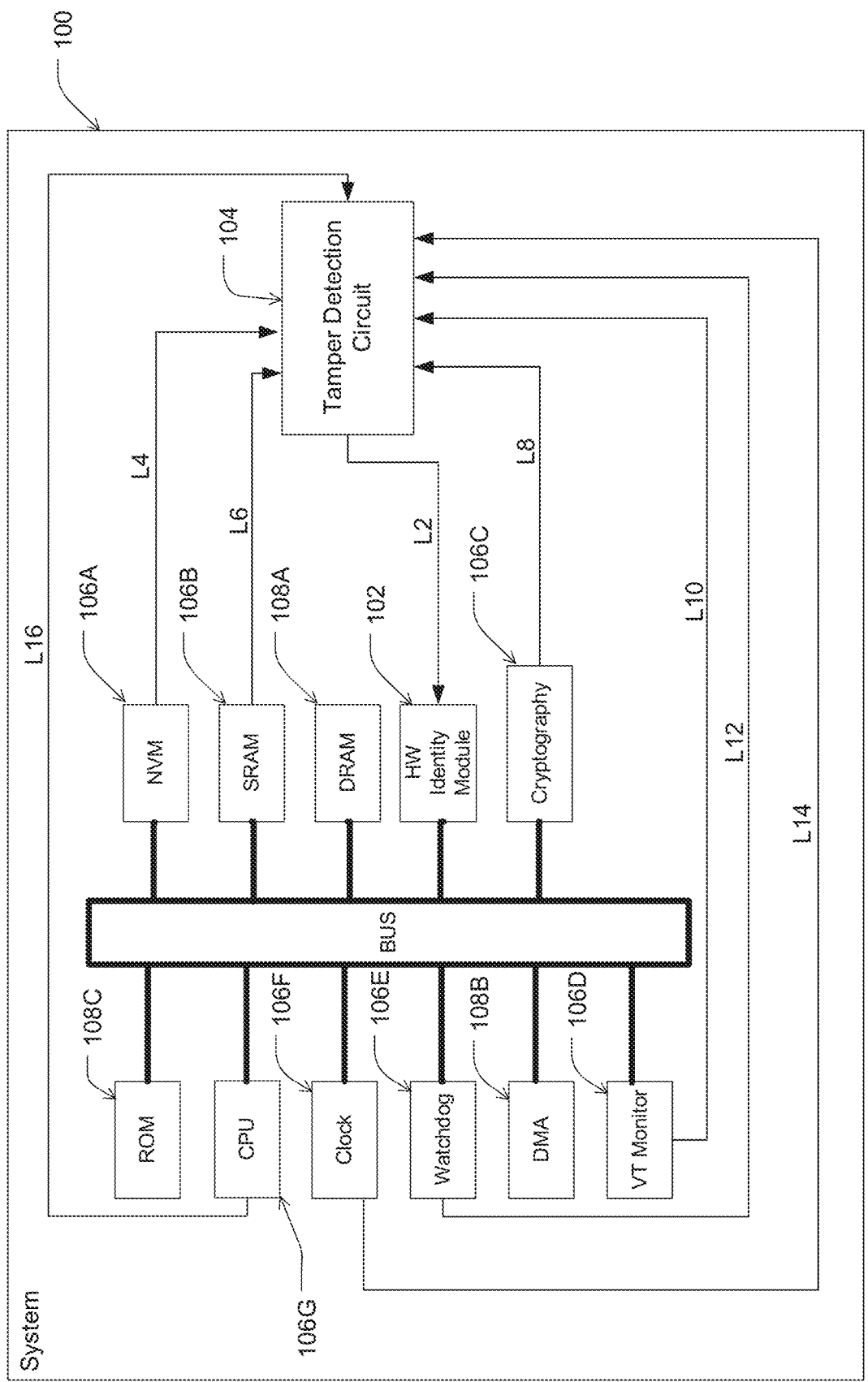
FIG. 1B shows an embodiment of the system of FIG. 1A with non-limiting examples of critical and non-critical components.

FIG. 1B shows example critical components 106A, 106B, 106C, 106D, 106E, 106F, and 106G coupled to the tamper detection circuit 104. The tamper detection circuit 104 (1) receives one or more signals from each of the critical components 106A-106G on lines L4, L6, L8, L10, L12, L14, and L16, and (2) generates an output signal on line L2 that is routed to the hardware identity module 102. In some embodiments, the lines L2-L16 may be wires. In some embodiments, the lines L2-L16 may be conductive traces on a circuit board on which the system 100 is disposed. The hardware identity module 102 incorporates the output signal from the tamper detection circuit 102 into one or more operations. In some embodiments, the hardware identity module 102 uses the output signal to generate secret information (e.g., key, secret, or share of a key or secret). FIG. 1B also shows non-critical components 108A, 108B, and 108C of the system 100. The non-critical components 108A-108C may be those that do not operate on or store protected data, and which therefore do not need protection against tampering in some embodiments. Accordingly, in some embodiments the non-critical component 108A-108C do not feed signals to the tamper detection circuit 104.

In some embodiments, one or more of the critical components 106A-106G may be configured to interact with the hardware identity module 102. During operation of the system 100, the critical components 106A-106G may interact with the hardware identity module 102 to perform various operations. In some embodiments, the hardware identity module 102 may be used to verify security of the system 100. For example, the hardware identity module 102 may be used to authenticate the system 100 to a verifier using secret information generated by the hardware identity module 102. In another example, the hardware identity module 102 may be used to encrypt data and/or decrypt data using secret information generated by the hardware identity module 102. In some embodiments, the secret information generated by the hardware identity module 102 may be communicated via a communication bus to one or more of the critical component(s). For example, one or more memory components 106A-106B may store secret information generated by the hardware identity module 102. In another example, the CPU 106G may receive secret information generated by the hardware identity module 102 to perform operations. In yet another example, the cryptography component 106C may receive secret information generated by the hardware identity module 102 to perform one or more cryptographic operations (e.g., encryption and/or decryption).

In some embodiments, one or more of the critical components 106A-106G may receive, process, and/or generate data that is to be secured from being revealed outside of the system 100. Security offered by the hardware identity module 102 may be extended to the component(s) by incorporating signals from the component(s) in the tamper detection circuit 104 to generate the output signal on line L2. Accordingly, tampering with any of the component(s) may affect operation of the hardware identity module 102. As a result of the tampering, the hardware identity module 102 may (1) prevent generation of secret information that allows authentication of the system 100 or (2) generate incorrect information. This in turn may prevent use of the system 100, and prevent access to data in the component(s). For example, the CPU 106G may be processing information that is to be protected (e.g., a social security number, bank account number, or other information). If an adversary were to tamper with the CPU 106G, a signal generated by the CPU 106G on line L16 to the tamper detection circuit 104 may change. The change in the signal on line L16 may cause the output signal on line L2 generated by the tamper detection circuit 104 to change, and prevent the hardware identity module 102 from generating secret information. The hardware identity module 102 may be configured to prevent access to the system 100 in response to the change in the output signal on line L2.

In some embodiments, the tamper detection circuit 104 may be configured to receive one or more signals from one or more memory components of the system 100. For example, the tamper detection circuit 104 may be configured to receive signals from the non-volatile memory (NVM) component 106A and the static random access memory (SRAM) component 106B on lines L4 and L6 respectively as shown in FIG. 1B. In some embodiments, the tamper detection circuit 104 may be configured to receive values of predetermined memory locations in a memory component. For example, the tamper detection circuit 104 may receive a value stored at a particular memory address. Tampering with a respective memory component may result in a change of the value stored at the memory address. In some embodiments, the tamper detection circuit 104 may be configured to receive values of one or more memory controller settings of the memory component. For example, the tamper detection circuit 104 may be configured to receive a read or write cycle time setting of the memory controller.

In some embodiments, the tamper detection circuit 104 may be configured to receive one or more signals from accelerator components of the system 100. An accelerator component is a special purpose processor that performs a specific set of operations for the system 100. The accelerator component may perform the operations more efficiently than a general purpose processor of the system 100. In some embodiments, the accelerator component may be a cryptography component 106C configured to perform one or more cryptographic operations for the system 100. For example, the cryptography component 106C may perform encryption and decryption operations for the system 100. In another example, the system 100 may include an accelerator to perform hashing operations. In yet another example, the system 100 may include an accelerator to perform encryption and decryption according to a specific type of protocol (e.g., AES). The cryptography component 106C outputs a signal on line L8 to the tamper detection circuit 104. In some embodiments, the tamper detection circuit 104 may be configured to receive values of one or more configuration registers from an accelerator. For example, the tamper detection circuit 104 may be configured to receive bit values of one or more registers of the cryptography component 106C. The registers may correspond to configuration settings of the cryptography component 106C that do not change during operation of the system 100.

In some embodiments, the tamper detection circuit 104 may be configured to receive one or more signals from a voltage monitor 106D of the system 100 on line L10. The voltage monitor 106D may be configured to monitor one or more voltage values of the system 100. For example, the voltage monitor 106D may monitor a voltage of a power input of the system 100. In some embodiments, the tamper detection circuit 104 may be configured to receive values of one or more configuration register values of the voltage monitor 106D on line 10. For example, the voltage monitor 106D may include configuration registers storing a voltage value against which the voltage monitor 106D compares a voltage that is being monitored. The tamper detection circuit 104 may receive the values of the configuration registers on the line L10.

In some embodiments, the tamper detection circuit 104 may be configured to receive one or more signals from a watchdog timer 106E of the system 100 on line L12. The watchdog timer 106E may be used by the system 100 to monitor faults in computations performed by the system 100. For example, the system 100 may use the watchdog timer 106E to determine if an operation has timed out. The tamper detection circuit 104 may be configured to receive values of one or more configuration settings of the watchdog timer 106E on line L12. For example, the tamper detection circuit 104 may receive bit values that specify the watchdog timeout of the watchdog timer 106E on the line L12.

In some embodiments, the tamper detection circuit 104 may be configured to receive one or more signals from general purpose input/output (GPIO) component 106F of the system 100 on line L14. The GPIO component 106F of the system may comprise one or more pins of the system 100 that can be configured to behave as input or output. The GPIO component 106F may store multiplex settings in configuration registers. In some embodiments, the tamper detection circuit 104 may be configured to receive values of the configuration registers of the GPIO component 106F on the line L14.

In some embodiments, the tamper detection circuit 104 may be configured to receive one or more signals from a CPU 106G of the system 100 on line L16. In some embodiments, the tamper detection circuit 104 may be configured to receive one or more values stored in one or more process registers of the CPU 106G on the line L16. For example, the tamper detection circuit 104 may be configured to receive an address value stored at one or more locations in the process register, stack pointer, and/or program counter. In some embodiments, the value(s) stored in the process register(s) may be constant during operation of the system 100. For example, a program cannot have instructions stored beyond a location(s) in the process register(s). Thus the value(s) stored in the location(s) may not change during operation of the system 100.

In some embodiments, the tamper detection circuit 104 may not receive signals from the non-critical components 108A-108C. For example, as shown in FIG. 1B, the dynamic random access memory (DRAM) 108A, direct memory access (DMA) 108B read only memory (ROM) 108C components are non-critical components as they are not coupled with the tamper detection circuit 104.

In some embodiments, the critical components and non-critical components are not limited to those illustrated in FIG. 1B. Some embodiments are not limited to a specific set of critical or non-critical components described herein, as examples discussed herein are provided for illustrative purposes. In some embodiments, any component of the system 100 can be configured as a critical component or a non-critical component.

In some embodiments, the tamper detection circuit 104 may be configured to receive signals indicating from the critical components 106A-106G on lines L4-L16 and generate an output signal on line L2 based on the received signals. In some embodiments, the output signal on line L2 indicates a state of the critical components 106A-106G. The output signal on L2 may indicate whether any of the critical components 106A-106G have been tampered with. In some embodiments, the tamper detection circuit 104 propagates the output signal on line L2 to the hardware identity module 102 without additional processing. A change in any of the signals received by the tamper detection circuit 104 may cause the tamper detection circuit 104 to propagate a changed output signal to the hardware identity module 102 without further processing. In some embodiments, operation of the hardware identity module 102 may be affected in response to a change in the output signal output by the tamper detection circuit 104 on line L2 as described herein.

In some embodiments, the tamper detection circuit 104 may comprise a logic circuit configured to generate an output signal based on the received signals. In at least some embodiments, the tamper detection circuit 104 may be configured to implement combinatorial logic that combines the received signals on lines L4-L16 into the output signal on line L2. For example, the signals may comprise bit values received from the critical components 106A-106G. In this example, the tamper detection circuit 104 may be configured to combine the bit values to generate the value of the output signal. In at least some embodiments, the tamper detection circuit 104 may be configured to non-linearly mix values of the received signals to generate the output signal. Such mixing may prevent determining how signals received by the tamper detection circuit 104 affect the output signal. For example, the tamper detection circuit 104 may be configured to use ciphering techniques to generate the output signal. In another example, the tamper detection circuit 104 may be configured to use hashing techniques to generate the output signal. In at least some embodiments, the tamper detection circuit 104 may be configured to compress the received signals to generate the output signal. For example, the number of bits in the output signal may be less than the number of total bits of input signals received by the tamper detection circuit 104.

In some embodiments, the tamper detection circuit 104 may be configured to generate the output signal on line L2 such that the output signal is resistant to localized attacks on the tamper detection circuit 104. In at least some embodiments, the output signal may meet an avalanche condition with respect to the signals received by the tamper detection circuit 104 in which a single change in one of the signals received by the tamper detection circuit 104 results in a 50% change in the output signal. For example, the signals received by the tamper detection circuit 104 comprise a first set of bits (e.g., a string of 16 bits), and the output signal may comprise a second set of bits (e.g., a string of 8 bits). In this example, a single bit change in the first set of bits causes the tamper detection circuit 104 to modify approximately half (e.g., 3, 4, or 5) of the second set of bits.

FIG. 1C illustrates an example system 110 in which the system 100 including the tamper detection circuit 104 and hardware identity module 102 may be implemented. The system 110 may be a mobile device 110. The mobile device 110 may include a screen 112 via which a user of the mobile device 110 may interact with the mobile device 110. For example, the user may interact with user interfaces of software applications that are executed on the mobile device 110. The mobile device 110 includes a speaker 114 via which a user may receive sound signals from the mobile device 110. For example, a user may user the mobile device 110 to make a phone call, and listen to audio signals transmitted from another device via the speaker 114. The device 110 includes a button 116 which may provide an input mechanism by which a user of the device 110 can interact with the device 110 and/or one or more software applications executing on the device 110. In some embodiments, the device 110 may be configured to communicate with other systems. For example, the device 110 may be configured to connect to a network (e.g., the Internet, cellular network) via which the device 110 may communicate with other systems.

In some embodiments, the system 100 may be integrated as a part of the mobile device 110. For example, the system 100 may comprise a system on a chip that forms part of the mobile device 110. The system 100 may make the device 110 more resistant to tampering. For example, if an adversary were to attempt to tamper with the device 110 to extract information from the device 110, the system 100 may provide the device 110 protection against such tampering. In another example, if the device 110 has been tampered with, the system 100 may prevent the device 110 from being authenticated by other devices that the device 110 is in communication with. Some embodiments are not limited to implementation in a mobile device. Some embodiments may be implemented in any computer system.

Figure 2:
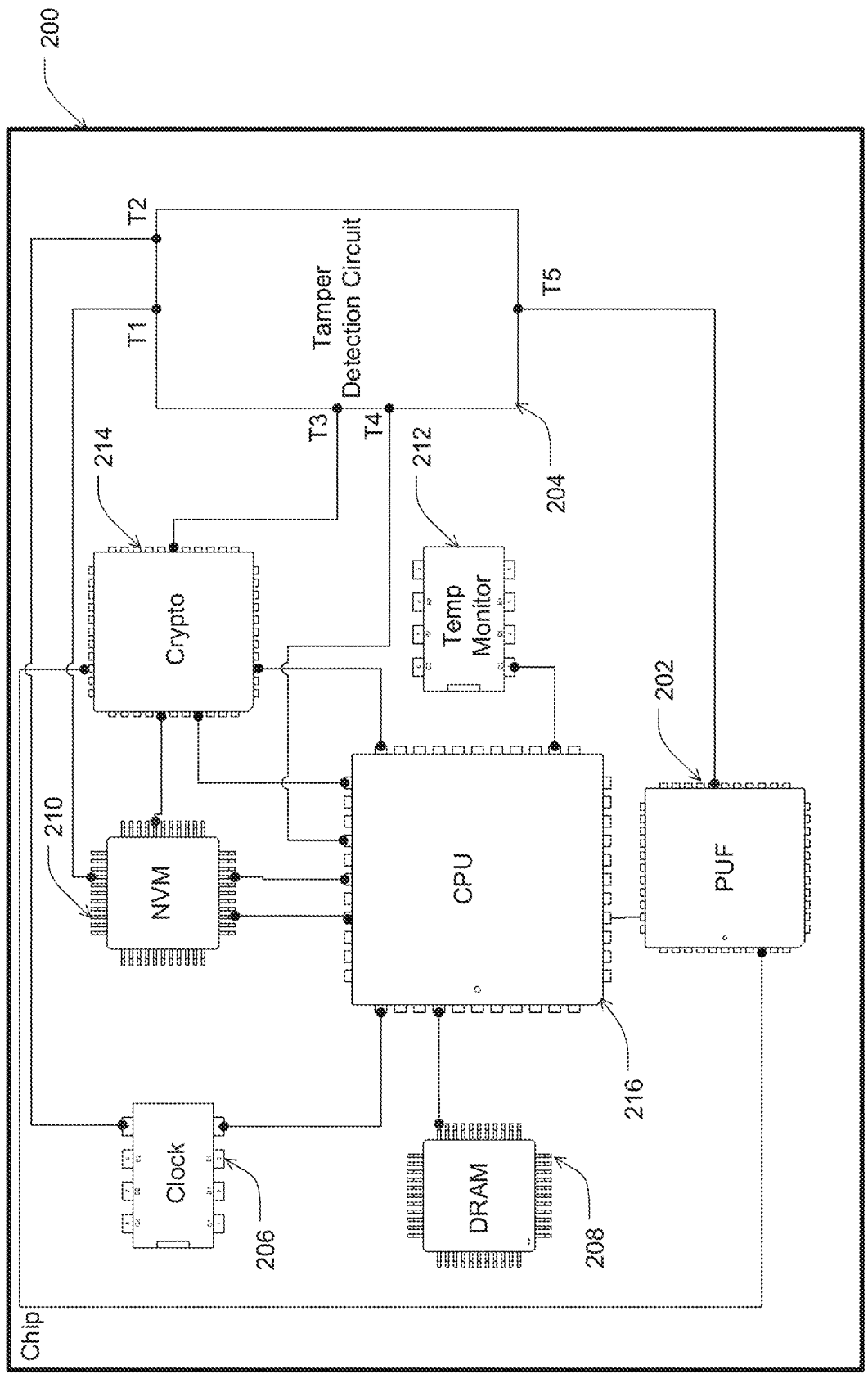
FIG. 2 shows an embodiment of a system on a chip including a tamper-resistant component network.

FIG. 2 illustrates an example chip 200 comprising a tamper resistant network including a PUF, in accordance with some embodiments. The chip 200 includes a tamper detection circuit 204 which is coupled to wire traces T1, T2, T3, and T4 on the chip 200 via which the tamper detection circuit 204 receives signals from a clock 206, NVM 210, a cryptography engine 214, and the CPU 216. The tamper detection circuit 204 outputs an output signal to wire trace T5 for transmission to a PUF 202. The chip 200 includes DRAM 208, and a temperature monitor 212. The chip 200 does not include wire traces from the DRAM 208 or the temperature monitor 212 to the tamper detection circuit 204.

In some embodiments, the tamper detection circuit 204 generates the output signal on tract T5 based on the signals received from the clock 206, NVM 210, cryptography engine 214, and the CPU 216 on traces T1-T4. Tampering with any of the clock 206, NVM 210, cryptography engine 214, or the CPU 216 may result in a change in the signal that is transmitted to the tamper detection circuit 204 on the chip 200. In response, the tamper detection circuit 204 may modify the output signal on trace T5 that is output to the PUF 202. The PUF 202 may prevent generation of secret information as a result of the change in the output signal and/or generate incorrect information. Examples of how the output signal is incorporated in operation of the PUF 202 are discussed below in reference to FIGS. 5A-5B.

In some embodiments, tampering with the DRAM 208 and/or the temperature monitor 212 may not affect the output signal generated by the tamper detection circuit 204. As the chip 200 does not include traces that couple the DRAM 208 or the temperature monitor 212 to the tamper detection circuit 204, the tamper detection circuit 204 may not extend tamper protection of the PUF 202 to the temperature monitor 212 or to the DRAM 208.

Figure 3:
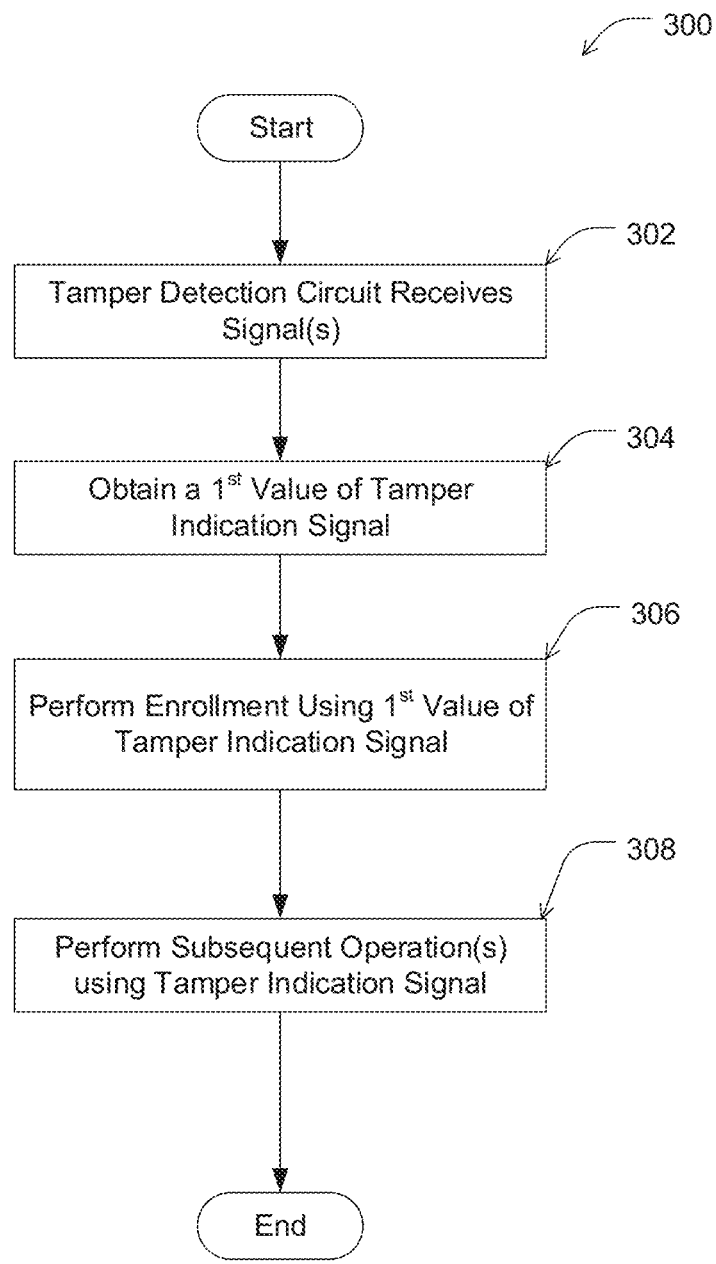
FIG. 3 shows an embodiment of a process for enrolling secret information as may applied according to aspect of the present application.

FIG. 3 illustrates a process 300 of enrolling secret information, in accordance with some embodiments. Process 300 may be performed by system 100 described above with reference to FIGS. 1A-1C. Process 300 may be performed when the system is known to be in a secure state in which the risk of adversarial tampering with the system is minimized. For example, process 300 may be performed in a trusted manufacturing facility where the system cannot be accessed by an adversary. Process 300 may also be performed while the system 100 is in use outside of a secure environment.

Process 300 begins at block 302 where the tamper detection circuit (e.g., tamper detection circuit 104) receives one or more signals from one or more components that are part of a tamper resistant network of the system. For example, the signal(s) may be signals from critical component(s) 106. In some embodiments, the system may be powered on, and the signal(s) may take on a set values when the system is powered on. In some embodiments, the set of values may be constant while the system is powered on absent tampering with the critical component(s) 106. For example, the tamper detection circuit may receive values stored in one or more memory locations of a memory component. In another example, the tamper detection circuit may receive values of one or more registers in a cryptography engine of the system. In yet another example, the tamper detection circuit may receive one or more values stored in process registers of a CPU of the system.

Next, process 300 proceeds to block 304 where the system obtains a first output signal (also referred to as "tamper indication signal") generated by the tamper detection circuit. In some embodiments, the tamper detection circuit may generate the tamper indication signal in response to being turned on. For example, the signals from the critical component(s) may be propagated to the tamper detection circuit upon power up, and the output signal may go to the first value upon receipt of the signal(s) at the tamper detection circuit.

In at least some embodiments, the tamper detection circuit applies non-linear mixing of the signal(s) received from the critical component(s) to generate the output signal. The non-linear mixing may prevent determination of how any one of the signal(s) affects the tamper indication signal. In some embodiments, the signal(s) receives at block 302 may be a set of bit values. In some embodiments, the tamper detection circuit may apply non-linear mixing of the bit values using cipher techniques. For example, the tamper detection circuit may be configured to use advanced encryption standard (AES), data encryption standard (DES), substitution boxes (S-boxes), and/or elliptic curve cryptography. In some embodiments, the tamper detection circuit may apply non-linear mixing of the bit values using hashing techniques. For example, the tamper detection circuit may be configured to use a secure hash algorithm (SHA) and/or the MD5 hashing algorithm. Some embodiments are not limited to any particular technique of applying non-linear mixing.

In at least some embodiments, the tamper detection circuit may be configured to compress the signal(s) received from the critical component(s). For example, if the signal(s) are a set of a first number of bit values, the tamper detection circuit generates a tamper indication signal that is a set of a second number of bit values that is less than the first number of bit values. In some embodiments, the tamper detection circuit expands the signal(s) received from the critical component(s). For example, if the signal(s) are a set of a first number of bit values, the tamper detection circuit generates a tamper indication signal that is a set of a second number of bit values that is greater than the first number of bit values.

In some embodiments, the tamper detection circuit may be configured to have an avalanche effect such that a change in one of the signals received by the tamper detection circuit changes the output signal generated by the tamper detection circuit such that the resulting change in the output signal appears random to an observer. In some embodiments, a single bit change in the received signal(s) causes half of the bits in the output signal to change. For example, if the received signal(s) form a first set of bits, and the tamper indication signal forms a second set of bits, a change in one of the first set of bits results in half of the second set of bits changing. In another example, if a single one of the first set of bits changes, each of the second bit changes with a probability of fifty percent. In some embodiments, the avalanche effect is not strictly restricted to exactly half of the output signal bits changed in response to a single input bit change. For example, the number of the output signal bits that changes in response to a single input bit change may be one, two, three, or four bits less or more than half of the number of output signal bits. In another example, the number output signal bits may change in response to a single input bit change may be approximately 45%, 46%, 48%, 49%, 50%, 51%, 52%, 53%, 54%, or 55%.

After generating a first value of the tamper indication signal at block 304, process 300 proceeds to block 306 where the system performs enrollment using the first value of the tamper indication signal generated by the tamper detection circuit. In some embodiments, the hardware identity module of the system (e.g., a PUF) may be configured to use the tamper indication signal to generate secret information during enrollment. The hardware identity module may be configured to enroll with the secret information generated using the first value of the tamper indication signal. For example, the hardware identity module may be configured to use the first value of the tamper indication signal to generate a key or shares of a key for use in subsequent authentication of the system performed using the hardware identity module. The first value of the tamper indication signal may be a value that is known to be based on the critical component(s) being in a secure state. For example, the first value of the tamper indication signal may be generated when the system is in a manufacturing facility. Accordingly, the first value is associated with a secure state of the components in the system. Some embodiments incorporating the tamper indication signal in enrollment performed by the hardware identity module are described below with reference to FIG. 5.

Next, process 300 proceeds to block 308 where the system performs one or more subsequent operations using the tamper indication signal. After performing enrollment using the first value of the tamper indication signal, the system may be configured to use the tamper indication signal in subsequent operations, and provide protection against tampering after the enrollment. For example, a change in the tamper indication signal may prevent generation of secret information.

Figure 4:
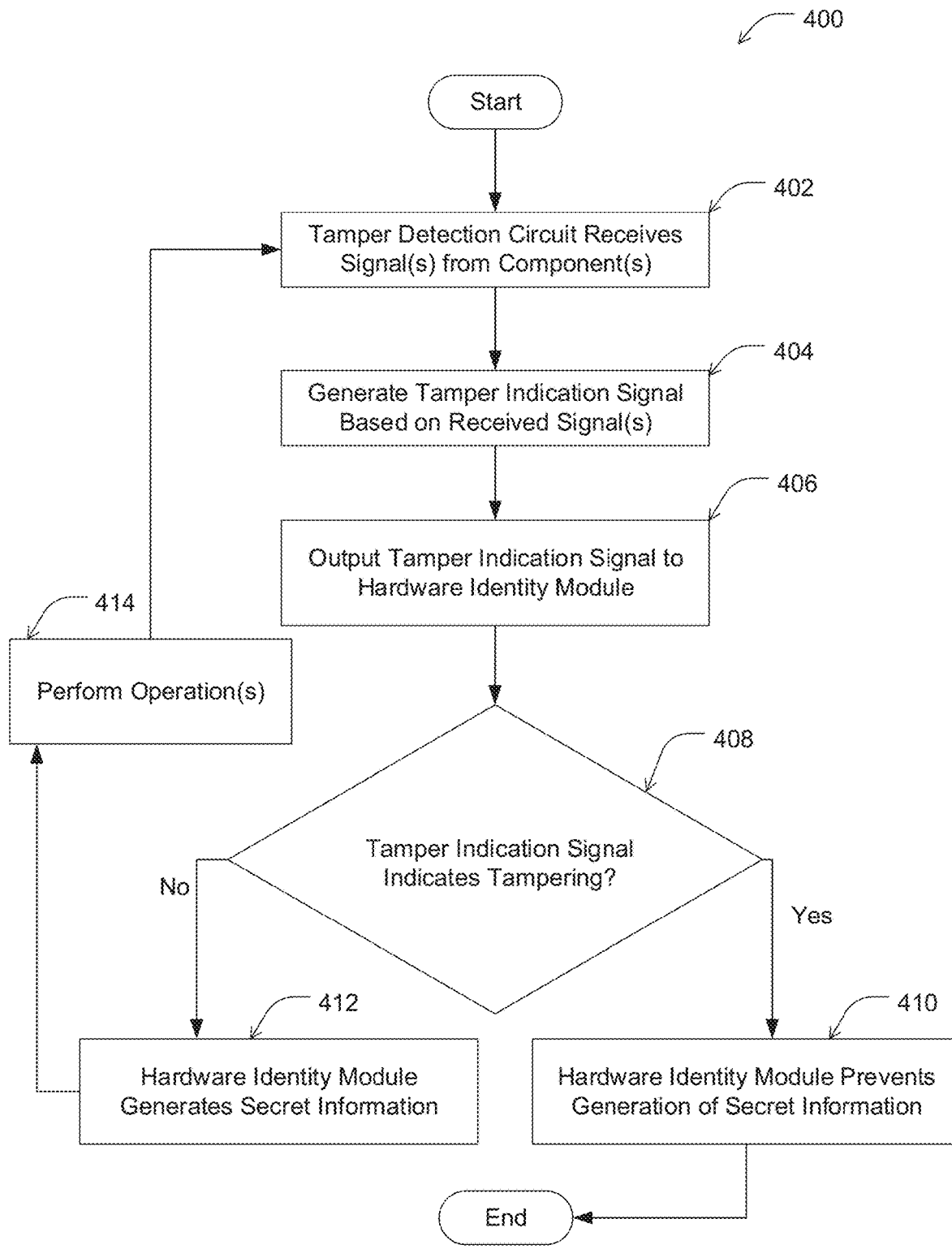
FIG. 4 shows an embodiment of a process for protecting a system against tampering according to an aspect of the present application.

FIG. 4 illustrates a process 400 of protecting a system against tampering, according to some embodiments. Process 400 may be performed by system 100 described above with reference to FIG. 1 as a non-limiting example. In some embodiments, process 400 may be performed at block 308 of process 300 described above with reference to FIG. 3. For example, process 400 may be performed after enrollment is completed with a first value of the tamper indication signal.

Process 400 begins at block 402 where the tamper detection circuit (e.g., tamper detection circuit 104) receives one or more signals from the component(s). For example, the signal(s) may be signals from critical component(s) 106. In one example, the tamper detection circuit may receive values stored in one or more memory locations of a memory component. In another example, the tamper detection circuit may receive values of one or more registers in a cryptography engine of the system. In yet another example, the tamper detection circuit may receive one or more values stored in process registers of a CPU of the system. In some embodiments, the signal(s) may be a set of bit values that are received by the tamper detection circuit. In some embodiments, the signal(s) are the same signal(s) received during an enrollment phase performed by the system (e.g., during process 300).

Next, process 400 proceeds to block 404 where the tamper detection circuit generates the tamper indication signal. In some embodiments, the tamper detection circuit may generate the tamper indication signal when the system is powered on without further processing. For example, the signals from the critical component(s) may be propagated to the tamper detection circuit upon power up, which in turn generates the tamper indication signal. In some embodiments, the tamper detection circuit generates the tamper indication signal based on the received signal(s) in the same manner as performed during enrollment (e.g., during process 300). In some embodiments, the tamper detection circuit is configured to continuously output the tamper indication signal. For example, the signal(s) may be wired to the tamper detection circuit such that the tamper detection circuit continuously outputs the tamper indication signal generated based on the received signal(s).

Next, process 400 proceeds to block 406 where the tamper indication signal is output to the hardware identity module. In some embodiments, the tamper indication signal is connected (e.g., by wire or trace) to the hardware identity module and is regularly, and in some cases continuously, output to the hardware identity module. The hardware identity module may incorporate the tamper indication signal in one or more operations performed by the hardware identity module. For example, the hardware identity module may be configured to use the tamper indication signal to generate secret information that was enrolled during an enrollment phase (e.g., in process 300). Examples of how the tamper indication signal is used by the hardware identity module to generate secret information is described below in reference to FIG. 5.

Next, process 400 proceeds to block 408, where it is determined whether the tamper indication signal indicates tampering. In some embodiments, the tamper indication signal indicates occurrence of tampering if the tamper indication signal is different from a value of the tamper indication signal obtained during a previously performed enrollment (e.g., during process 300). If the value of the tamper indication signal changes from the value obtained during the enrollment phase, the tamper indication signal may indicate that one or more of the component(s) have been tampered with. In some embodiments, the signal(s) received from the component(s) may be deterministic such that tampering with a respective component results in a change in the tamper indication signal.

If at block 408 the tamper indication signal indicates an occurrence of tampering, the process 400 proceeds to block 410 where the hardware identity module prevents generation of secret information or generates incorrect information. For example, the hardware identity module may be configured to prevent generation of the secret information if the tamper indication signal is a value different than the first value with which the hardware identity module performed enrollment. In another example, the hardware identity module may generate incorrect secret information if the tamper indication signal is a value different than the first value. In some embodiments, the hardware identity module may prevent completion of one or more other operations by the system by preventing generation of correct secret information. For example, the hardware identity module may prevent the system from being authenticated by a verifier. In some embodiments, the hardware identity module may be configured to generate a flag indicating tampering as a result of the tamper indication signal indicating occurrence of tampering.

In some embodiments, the hardware identity module may be configured to generate shares of a key or secret. In some embodiments, the hardware identity module may be configured to generate shares sequentially. The tamper indication signal may indicate occurrence of tampering while the hardware identity module is generating shares of a key or secret to execute a cryptographic operation. For example, the tamper indication signal may change while the hardware identity module is recovering the shares. The change in the tamper indication signal may cause the hardware identity module to stop subsequent recovery of shares of the key or secret. For example, the hardware identity module may have correctly recovered a first share that was enrolled to perform an operation. Prior to recovery of a second share, the tamper indication signal may change in response to tampering with one or more components. In response to the change in the tamper indication signal, the hardware identity module may prevent recovery of the second share and, in turn, prevent completion of the operation.

After preventing generation of the secret information at block 410, process 400 may end. For example, the system may be unable to continue performing operations as a result of the detected tampering. The system may stop execution of operations in order to protect data and/or information in the system. In some embodiments, further access to the system may be blocked as a result of the detected tampering.

If at block 408 the tamper indication signal does not indicate an occurrence of tampering, then process 400 proceeds to block 412 where the hardware identity module is able to generate the secret information using the value of the tamper indication signal. For example, if the value of the tamper indication signal is the same as a first value of the tamper indication signal used during enrollment (e.g., during process 300), the hardware identity module may generate the secret information. The hardware identity module may be configured to recover secret information that was enrolled during an enrollment phase (e.g., during process 300).

After recovering the secret information at block 412, process 400 proceeds to block 414 where the system performs one or more operations. The system may use the generated secret information to allow the system to perform the operation(s). For example, the hardware identity module may allow the system to be authenticated by a verifier by generating the secret information. In another example, the system may be able to decrypt information using the generated secret information.

After performing the operation(s) at block 414, process 400 proceeds to block 402 where the tamper detection circuit continues to receive the signal(s) from the component(s). In some embodiments, the tamper detection circuit continuously receives the signal(s) from the component(s) during operation of the system. For example, the tamper detection circuit continuously receives the signal(s) while the system is powered on. In some embodiments, the system may be configured to continue to detect tampering. In some embodiments, the system may be configured to perform the detection continuously. For example, the system may perform steps 402-408 periodically to detect tampering.

Figure 5A:
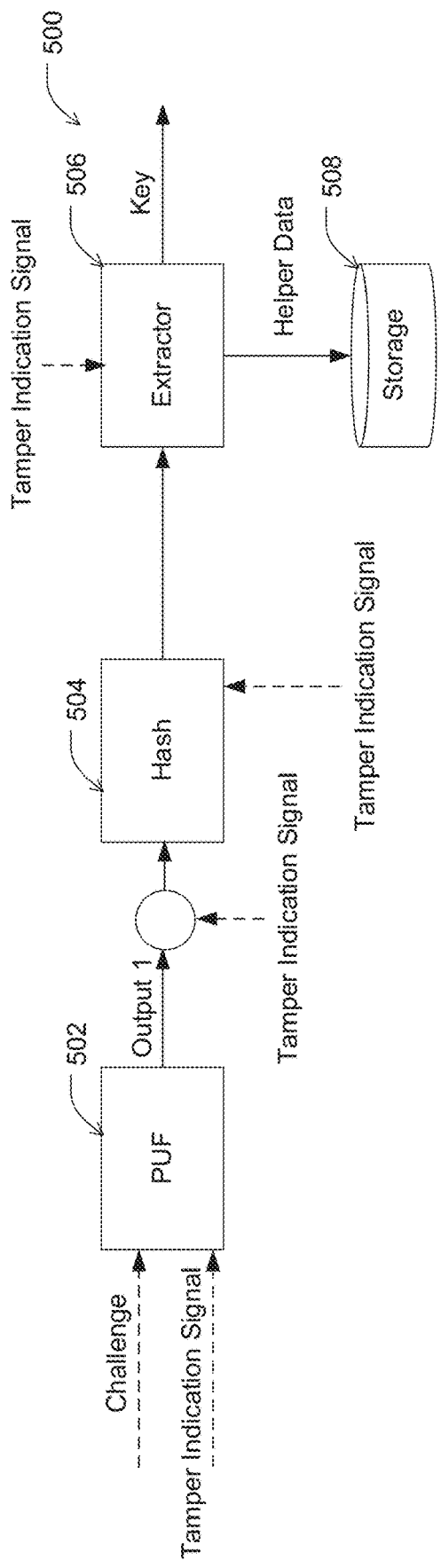
FIG. 5A shows non-limiting techniques of incorporating a tamper indication signal into operation of a PUF during enrollment of a key.
Figure 5B:
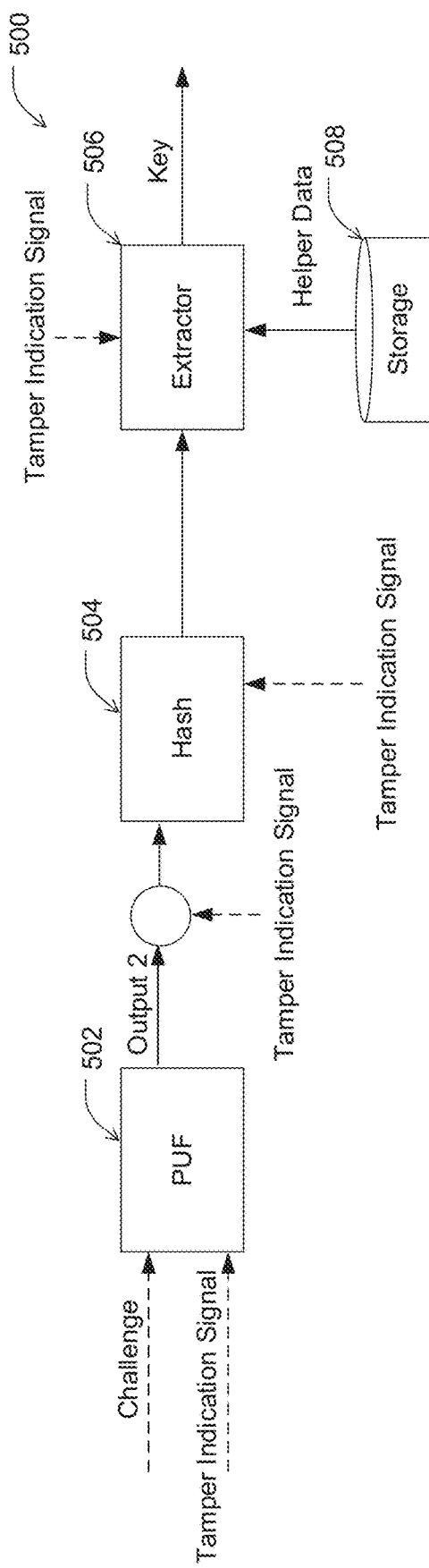
FIG. 5B shows non-limiting techniques of incorporating a tamper indication signal into operation of a PUF during recovery of a key.

FIGS. 5A-5B show various methods by which the tamper indication signal may be incorporated into operation of a hardware identity module 500, according to some embodiments. The hardware identity module 500 may be hardware identity module 102 described above with reference to FIGS. 1A-1C as a non-limiting example. Incorporation of the tamper indication signal into operation of the hardware identity module 500 may extend tamper protection by the hardware identity module 500 to one or more components.

The hardware identity module 500 includes a physical unclonable function (PUF) 502, a hashing component 504, an extractor 506, and storage 508. FIG. 5A shows operation of the hardware identity module 500 during an enrollment phase. During enrollment, the PUF 502 generates an output signal based on physical properties of the PUF 502. In some embodiments, the PUF 502 may be configured to generate the output signal based on a challenge received by the PUF 502. For example, the PUF 502 may receive a challenge value and generate an output signal based on the received challenge value. The challenge value may be a number, string, or other type of value. The output of the PUF 502 is hashed by the hashing component 504. The extractor 506 uses the hashed output to generate secret information (e.g., a key), and helper data. The helper data may be stored in storage 508 for subsequent use in regenerating the secret information.

FIG. 5B shows operation of the hardware identity module 500 after the enrollment phase (e.g., during authentication). The PUF 502 may be configured to generate an output signal. In some embodiments, the PUF 502 may be configured to generate the output signal based on a challenge. The challenge may be one that was used during the enrollment phase of the hardware identity module 500. The generated output signal of the PUF 502 is then hashed by a hashing component 504. The hashed PUF output signal is used by the extractor 506 to recover secret information (e.g., a key) that was generated during the enrollment phase. The extractor 506 may use helper data stored in storage 508 which was generated during the enrollment phase to recover the secret information using the hashed PUF output.

In some embodiments, the hardware identity module 500 may be configured to combine the tamper indication signal with a challenge that is fed to the PUF 502. For example, the hardware identity module 500 may be configured to perform concatenation, addition, a bitwise operation (e.g., XOR, AND, OR), and/or other operation with a challenge value and the value of the tamper indication signal. The hardware identity module 500 may then input the combined value into the PUF 502. The PUF 502 may be configured to generate an output based on the combined value. When generating secret information, the hardware identity module 500 may be configured to combine the challenge with the tamper indication signal as was done during an enrollment phase. During enrollment, the hardware identity module 500 may combine the challenge with a first value of the tamper indication signal. Tampering with a component that is coupled to the tamper detection circuit may change the value of the tamper indication signal from the first value. A change in the tamper indication signal may result in the combined value of the challenge and the tamper indication signal being different than in the enrollment phase. As a result, when the hardware identity module 500 performs recovery, the PUF 502 may generate an output that does not allow the hardware identity module 500 to recover the key that was generated during the enrollment phase. For example, the output signal of the PUF 502 may be too different (e.g., distance from the signal used during enrollment is beyond a threshold) for the extractor 506 to recover the key using the helper data.

In some embodiments, the hardware identity module 500 may be configured to incorporate the tamper indication signal by combining the tamper indication signal with an output generated by the PUF. For example, the hardware identity module 500 may be configured to perform concatenation, addition, a bitwise operation (e.g., XOR, AND, OR), and/or other operations with an output signal of the PUF and the tamper indication signal. The combined value may then be hashed by the hashing component 504 and used by the extractor 506 to generate the key. During enrollment, the hardware identity module 500 may combine an output signal of the PUF 502 with a first value of the tamper indication signal. Tampering with a component that is coupled to the tamper detection circuit may result in a change in the value of the tamper indication signal. When the hardware identity module 500 performs recovery, the combined PUF output and changed tamper indication signal may be different enough from the combined value used during enrollment. This prevents the hardware identity module 500 from recovering the key. For example, the distance between the combined output of the PUF 502 and the tamper indication signal after the tamper indication signal has changed may be too great for the extractor 506 to recover the key with the stored helper data.

In some embodiments, the hardware identity module 500 may be configured to incorporate the tamper indication signal in hashing the output of the PUF. In some embodiments, the tamper indication signal may be used to define an initial state of a hashing function. The initial state may affect the output of the hashing function. During enrollment, the hardware identity module 500 may be configured to use a first value of the tamper indication signal as an initial state for hashing an output of the PUF 502. The hashed PUF output 502 is then used by the extractor 506 to generate the key. When the hardware identity module 500 performs recovery, the hardware identity module 500 may use the tamper indication signal as the initial state of the hashing function. If the tamper indication signal changes from the first value, the hashed output of the PUF 502 may be too different from the hashed output used during enrollment for the extractor 506 to recover the key. Thus a change in the tamper indication signal prevents recovery of the key.

In some embodiments, the hardware identity module 500 may be configured to use the tamper indication signal to mask the helper data generated during enrollment. In subsequent recovery of the key, the hardware identity module 500 may be configured to unmask the stored helper data using the tamper indication signal. The hardware identity module 500 may use a first value to mask the helper data during enrollment. Tampering with a component coupled to the tamper detection circuit may result in the tamper indication signal changing from the first value. When the hardware identity module 500 performs recovery of the key, the hardware identity module 500 may be unable to unmask the stored helper data if the value of the tamper indication signal is different from the first value. Thus a change in the tamper indication signal prevents recovery of the key.

In some embodiments, to mask the helper data using a first value of the tamper indication signal, a code may be generated using the first value of the tamper indication signal. For example, a Hamming code may be determined using the first value of the tamper indication signal. The coded value generated using the first value of the tamper indication signal may then be combined with the helper data to mask the helper data. For example, the hardware identity module 500 may perform an XOR, or other operation on the coded value and a helper data value (e.g., a bit string) to generate the masked helper data. To recover secret information after enrollment, the hardware identity module 500 may be configured to unmask the helper data. In some embodiments, the hardware identity module 500 may be configured to input the stored masked helper data into a decoder. The decoder may output the combination of the original helper data with the first value of the tamper indication signal. In some embodiments, the tamper indication signal must have the same first value at the time of recovery in order to allow the hardware identity module 500 to unmask the helper data. For example, if an XOR operation was performed between the first value of the tamper indication signal and the helper data to generate the combined value, the helper data may be recovered by again performing an XOR operation on the combined value using the first value of the tamper indication signal. Accordingly, if the tamper indication signal does not have the first value at the time of recovery, the hardware identity module 500 may be unable to recover the helper data.

In some embodiments, the helper data may be used in its coded form to correct an output from the PUF. The corrected output may then be decoded to yield a combination of the key with the first value of the tamper indication signal. The tamper indication signal may then be used to recover the key from the combination if the tamper indication signal still has the first value. Otherwise, the hardware identity module 500 may be prevented from recovering the key.

Some embodiments may be configured to combine multiple techniques for incorporating the tamper indication signal into operation of the hardware identity module 500. For example, the hardware identity module 500 may be configured to combine the tamper indication signal with the challenge, and with an output of the PUF. In another example, the hardware identity module 500 may be configured to use the tamper indication signal as an initial state for hashing an output of the PUF, and to mask/unmask the helper data. Some embodiments are not limited to a particular technique or combination of techniques for incorporating the tamper indication signal into operation of the hardware identity module 500.

Some embodiments described herein may be used to extend tamper protection provided by secret information generators other than a PUF. The secret information generators may comprise cryptographic algorithms for generating a key or shares of a key. For example, a secret generator may be a component configured to perform encryption and decryption using symmetric-key algorithms such as the AES or DES algorithms. In another example, a secret generator may be a component configured to perform encryption and decryption using an asymmetric key algorithm such as the RSA algorithm.

Figure 6:
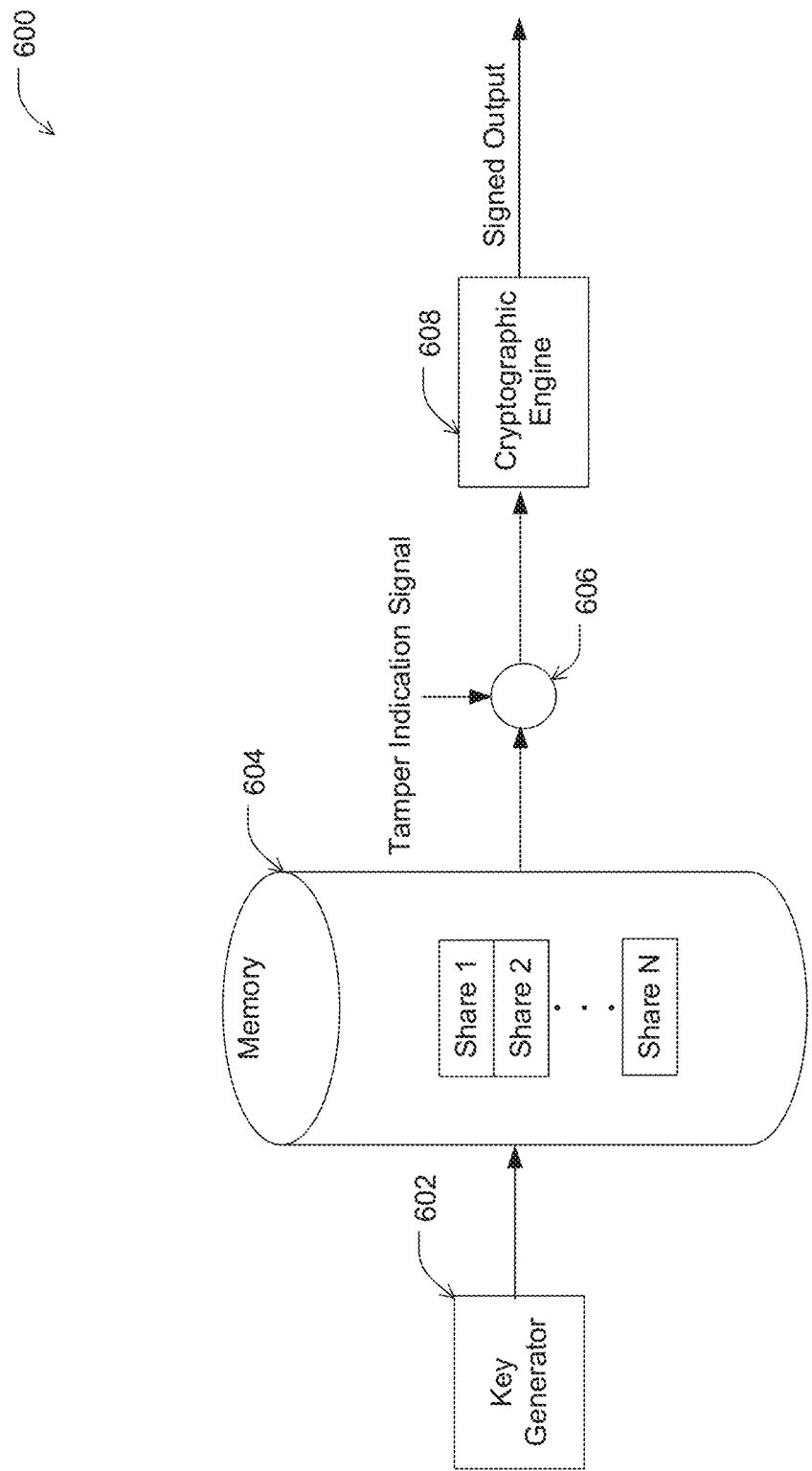
FIG. 6 shows an embodiment of a system for using a tamper indication signal to protect a system against tampering.

FIG. 6 shows a system 600 for providing tamper protection using a key generator 602, according to some embodiments. The system 600 incorporates the tamper indication signal in performing threshold cryptography to provide protection against tampering. Threshold cryptography involves performing operations in segments using shares of a key. A threshold number of operations must be completed in order for a threshold cryptographic operation to be completed. Thus the threshold cryptographic operation requires successful recovery of a threshold number of shares of the key.

In some embodiments, a key generator 602 may be configured to generate shares of a key. The generated shares are stored in memory 604. In some embodiments, each of the generated shares may be combined with a first value of the tamper indication signal. For example, the system 600 may XOR each share with a first value of the tamper indication signal. In order to successfully complete a threshold cryptographic operation, a threshold number of shares must be recovered. For example, an operation may require two shares be recovered to complete the operation. When the system 600 performs the operation, the system 600 may perform the operation in segments using one share at a time. For each segment, a stored share is read from the memory 604. The system 600 then combines the tamper indication signal with the respective share. In some embodiments, the stored share may be a combination of a first value of the tamper indication signal and a value generator 602. The system 600 uses a value of the tamper indication signal at the time of performing an operation to access the generated share to perform the operation. For example, if the share was combined with the first value of the tamper indication signal in an XOR operation when the share was first generated, the system 600 may perform an XOR operation between the stored value and a current value of the tamper indication signal to attempt to recover the share. The recovered share may then be transmitted to a cryptographic engine 608. The cryptographic engine 608 may perform an operation using the recovered share. In some embodiments, the cryptographic engine 608 may be configured to generate an output signed using the recovered share. If a threshold number of shares are successfully recovered and used to sign a respective output, the threshold cryptographic operation may be completed.

If, at the time of performing the operation, the tamper indication signal is different from the value used during generation of the shares, the system 600 may be prevented from completing the threshold cryptographic operation. For example, the system 600 may successfully perform a first segment using a first share. However, prior to recovering the second share, a component coupled to the tamper detection circuit may have been tampered with. This, in turn, triggers a change in the tamper indication signal. As a result of the changed tamper indication signal, the system 600 may be unable to recover subsequent shares of the key after the first share. For example, if the shares were generated using a first value of the tamper indication signal, a different value of the tamper indication signal may not allow the system 600 to recover subsequent shares. The share may not be recoverable at 606.

Based on the foregoing disclosure, it should be apparent to one of ordinary skill in the art that the embodiments disclosed herein are not limited to a particular computer system platform, processor, operating system, network, or communication protocol. Also, it should be apparent that the embodiments disclosed herein are not limited to a specific architecture.

It is to be appreciated that embodiments of the methods and apparatuses described herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features described in connection with any one or more embodiments are not intended to be excluded from a similar role in any other embodiments.

The terms "approximately," "substantially," and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A component circuit network for providing a system protection against tampering, the network comprising:
   a component in a secure processing chain of the system;
   a hardware identity module configured to generate at least a portion of a key based on physical properties of the hardware identity module;
   a logic circuit coupled to the component and the hardware identity module, the logic circuit configured to:
   receive a signal from the component; and
   output an output signal to the hardware identity module indicating whether the component has been tampered with;
   wherein the hardware identity module is configured to use the output signal indicating whether the component has been tampered with as keying information with which to generate the at least the portion of the key.

2. The network of claim 1, wherein the logic circuit is configured to cause the output signal to indicate that the component has been tampered with based on a change in the signal received from the component.

3. The network of claim 1, wherein the hardware identity module is configured to prevent generation of the at least the portion of the key when the output signal from the logic circuit indicates that the component has been tampered with.

4. The network of claim 3, wherein the hardware identity module is configured to:
   enroll the at least the portion of the key using a first value of the output signal from the logic circuit, wherein the first value indicates that the component has not been tampered with; and
   prevent generation of the at least the portion of the key using a value of the output signal that is different from the first value.

5. The network of claim 1, wherein:
   the signal from the component comprises a first plurality of bits, and the output signal with comprises a second plurality of bits; and
   the logic circuit is configured to cause a change in at least half of the second plurality of bits based on a change in one or more of the first plurality of bits.

6. The network of claim 1, further comprising:
   a plurality of components in the secure processing chain of the system;
   wherein the logic circuit is coupled to the plurality of components, and further configured to:
   receive signals from the plurality of components; and
   generate the output signal based on the signals received from the plurality of components, the output signal indicating whether one or more of the plurality of components have been tampered with.

7. The network of claim 6, wherein the logic circuit is configured to compress the signals received from the plurality of components to generate the output signal.

8. The network of claim 1, wherein the hardware identity module is configured to use the output signal as keying information to generate the at least the portion of the key by performing at least one of:
   providing the output signal as input to a physically unclonable function (PUF);
   combining the output signal with an output of the PUF;
   hashing an output of the PUF using the output signal; or
   unmasking helper data using the tamper indication signal.

9. A method of protecting a system against tampering, the method comprising:
   generating, by a hardware identity module and based on physical properties of the hardware identity module, at least a portion of a key;
   receiving, by a logic circuit, a signal from a component in a secure processing chain of the system;
   outputting, by the logic circuit based on the signal, an output signal to the hardware identity module, the output signal indicating whether the component has been tampered with;
   wherein generating the at least the portion of the key comprises using the output signal indicating whether the component has been tampered with as keying information to generate the at least the portion of the key.

10. The method of claim 9, further comprising causing the output signal to indicate that the component has been tampered with based on a change in the signal received from the component.

11. The method of claim 9, further comprising preventing generating of the at least the portion of the key when the output signal from the logic circuit indicates that the component has been tampered with.

12. The method of claim 11, further comprising:
    by the hardware identity module:
    enrolling the at least the portion of the key based on a first value of the output signal, the first value indicating that the component has not been tampered with; and
    preventing subsequent recovery of the at least the portion of the key when performed using a value of the output signal different from the first value.

13. The method of claim 11, further comprising:
    by the hardware identity module:
    generating helper data to recover the at least the portion of the key;
    masking the helper data with a first value of the output signal, the first value indicating that the component has not been tampered with; and
    preventing generating of the at least the portion of the key by preventing unmasking of the helper data with a value of the output signal different from the first value.

14. The method of claim 11, further comprising:
    by the hardware identity module:
    generating a first output based on the physical properties of the hardware identity module;
    hashing the first output using a first value of the output signal generated by the logic circuit, the first value indicating that the component has not been tampered with;
    generating the at least the portion of the key based on the hashed first output; and preventing generating of the at least the portion of the key when a respective output of the hardware identity module is hashed using a value of the output signal different from the first value.

15. The method of claim 11, further comprising:
by the hardware identity module:
inputting a first value of the output signal generated by the logic circuit into a physically unclonable function (PUF), the first value indicating that the component has not been tampered with;
receiving, in response to the inputting, a first PUF output;
generating the at least the portion of the key based on the first PUF output; and
preventing generating of the at least the portion of the key based on a PUF output generated in response to input of a value of the output signal different from the first value.

16. The method of claim 9, wherein generating the at least the portion of the key using the output signal as keying information to generate the at least the portion of the key comprises performing at least one of:
providing the output signal as input to a physically unclonable function (PUF);
combining the output signal with an output of the PUF;
hashing an output of the PUF using the output signal; or
unmasking helper data using the tamper indication signal.

17. A network for protecting a system against tampering, the network comprising:
a hardware identity module configured to generate at least a portion of a key based on physical properties of the hardware identity module;
a plurality of components of a secure processing chain of the system;
a logic circuit coupled to the plurality of components and the hardware identity module, the logic circuit configured to:
determine, based on signals from the plurality of components, that one or more of the plurality of components have been tampered with; and
output, to the hardware identity module, an output signal indicating that the one or more components have been tampered with;
wherein the hardware identity module is configured to prevent generation of the at least the portion of the key when the output signal indicating that the one or more components have been tampered with is used as keying information to generate the at least the portion of the key.

18. The network of claim 17, wherein the plurality of components comprise a clock, central processing unit (CPU), a cryptographic accelerator, and/or memory.

19. The network of claim 17, further comprising traces on a chip routing the signals from the plurality of components to the logic circuit, and a trace routing the output signal from the logic circuit to the hardware identity module.

20. The network of claim 17, wherein one or more of the signals from the plurality of components are configured to change in response to tampering with the one or more components.

21. The network of claim 17, wherein the hardware identity module is configured to generate a flag based on the signal indicating that the one or more components have been tampered with.

22. The network of claim 17, wherein the logic circuit is configured to non-linearly mix the signals from the plurality of components to generate the output signal.

23. The network of claim 17, wherein the hardware identity module is configured to use the output signal as keying information to attempt generation of the at least the portion of the key by performing at least one of:
providing the output signal as input to a physically unclonable function (PUF);
combining the output signal with an output of the PUF;
hashing an output of the PUF using the output signal; or
unmasking helper data using the tamper indication signal.

* * * * *